United States Patent

[11] 3,593,133

[72] Inventor Daniel A. Wisner
 Detroit, Mich.
[21] Appl. No. 693,776
[22] Filed Dec. 27, 1967
[45] Patented July 13, 1971
[73] Assignee RCA Corporation

[54] APPARATUS FOR COMPARING TWO DIMENSIONS
 4 Claims, 1 Drawing Fig.
[52] U.S. Cl. .................................................. 324/103 R,
 33/174 Q, 324/140 R
[51] Int. Cl. ..................................................... G01r 19/16,
 G01r 7/00
[50] Field of Search.......................................... 324/111,
 103, 103 P, 140; 328/135, 116, 147, 148; 340/248,
 172, 271, 267; 33/174 Q; 330/69, 30 D

[56] References Cited
 UNITED STATES PATENTS
| | | | |
|---|---|---|---|
| 2,468,687 | 4/1949 | Schmitt ......................... | 324/111 X |
| 3,371,419 | 3/1968 | Banks et al. .................. | 33/174 |
| 3,132,307 | 5/1964 | Augustine et al. ............ | 330/69 X |
| 3,181,350 | 5/1965 | Thomas et al. ............... | 324/103 X |
| 3,277,312 | 10/1966 | Harris............................ | 330/69 X |

Primary Examiner—Rudolph V. Rolinec
Assistant Examiner—Ernest F. Karlsen
Attorney—Edward J. Norton ABSTRACT: An apparatus is provided for storing a voltage corresponding to one dimension, for storing a second voltage corresponding to a second dimension, for comparing two voltages, and for indicating whether the difference between the two voltages is within an acceptable range. Such an apparatus can be used to indicate whether the maximum and the minimum diameters of a round object are close enough in value for the round object to be acceptable for use in applications where perfect roundness is desirable.

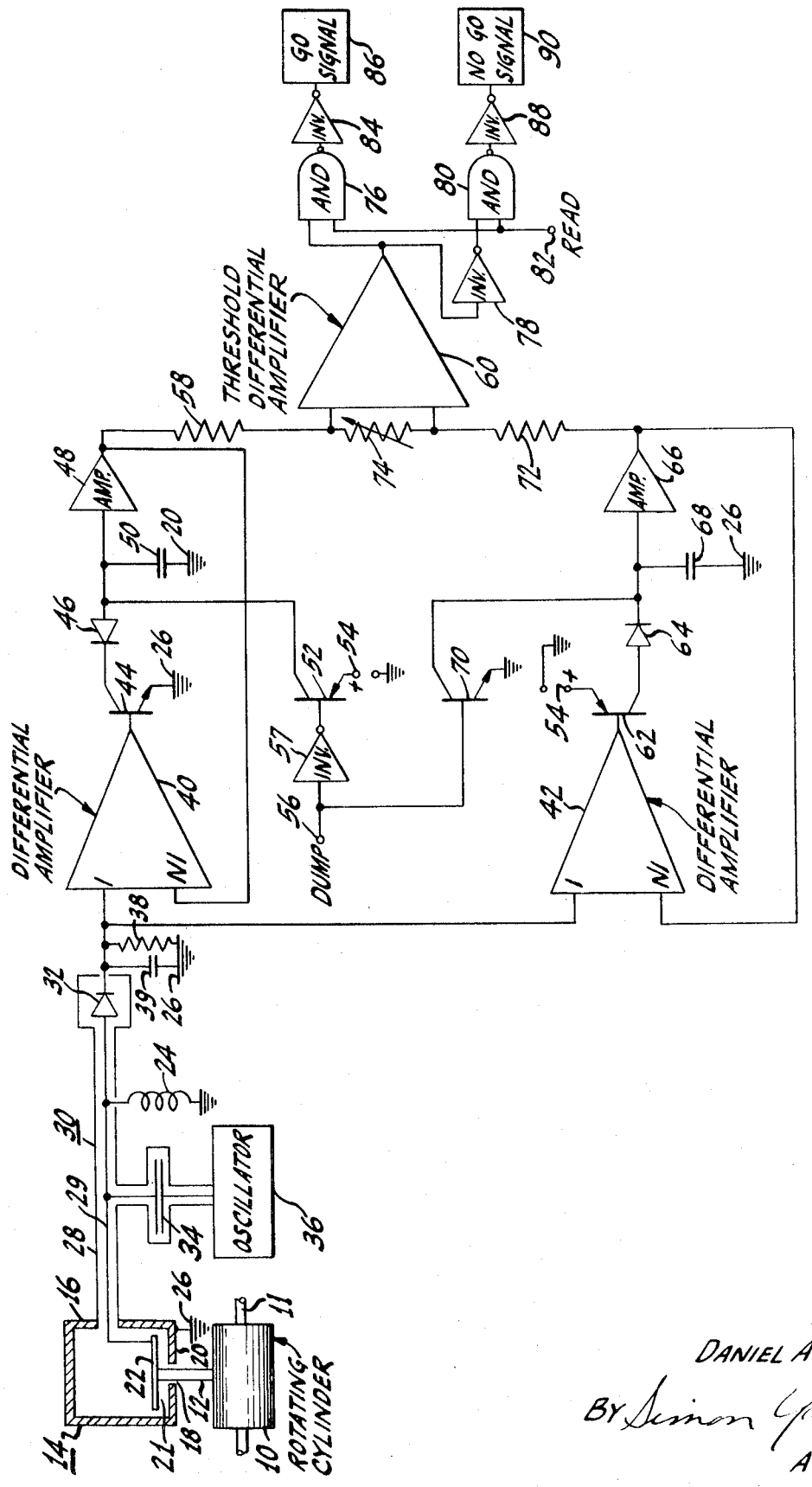

APPARATUS FOR COMPARING TWO DIMENSIONS

BACKGROUND

A completed round or cylindrical object may not be perfectly round and, in fact, something less than perfect roundness may be acceptable for the purpose for which the round or cylindrical object has been made. However, the degree of out-of-roundness, that is the difference between the maximum and the minimum diameter, of the object must not exceed a predetermined amount if the machine in or with which the object to be used is to operate satisfactorily. Manual inspection of each object is slow and expensive.

It is an object of this invention to provide an improved apparatus for comparing two dimensions.

It is a further object of this invention to provide improved apparatus to indicate when the difference between two dimensions are greater or less than a predetermined amount.

It is a still further object of this invention to provide improved apparatus for indicating out-of-roundness of a cylindrical object.

SUMMARY

In accordance with the invention, two voltages are stored, the magnitude of one voltage being a measure of the greater of the two dimensions to be compared and the magnitude of the other voltage being a measure of the smaller of the two dimensions to be compared. These two voltages are applied to a voltage comparison means and the output of the voltage comparison means is applied to a threshold detector which indicates whether the difference between the two stored voltages, and therefore the difference between the two corresponding dimensions, are within or outside of a predetermined amount. If the two dimensions to be compared are the maximum and minimum diameter of a round object such as a cylinder, the cylinder is rotated about its axis and a voltage is stored which is a measure of the maximum diameter of the cylinder and another voltage is stored which is a measure of the minimum diameter of the cylinder, these two voltages being applied to the voltage comparison means.

The invention will be better understood upon reading the following description in connection with the accompanying drawing which comprises a single FIGURE illustrating, partially in block form, an apparatus including one embodiment of the invention.

Let it be assumed that the two dimensions to be compared are the maximum and minimum diameters of a cylinder 10. The cylinder 10 is mounted for rotation on a shaft 11 about its axis by apparatus not shown. An insulating feeler 12 of a dimension sensing means 14 is placed in contact with the surface of the cylinder 10. The dimension sensing means 14 comprises a conductive housing 16, there being a hole 18 through one wall 20 of the housing 16, the insulating rod 12 extending through the hole 18. The inner end of the rod 12 is attached to a conductive capacitor plate 22. An inductance coil 24 is connected between the plate 22 and ground 26. A spring (not shown) urges the plate 22 towards the wall 20, whereby the plate 22 and the wall 20 comprise a capacitor 21 whose capacity depends on the distance between the plate 22 and the wall 20. As the cylinder 10 rotates, the rod 12 moves in and out of the housing 16 an amount depending on the difference between the maximum and the minimum diameters of the cylinder 10. The change in capacity of the capacitor 21, and the change in the tuned frequency of the parallel tuned circuit comprising the capacitor 21 and the inductor 24 therefore depends on the difference between the maximum and minimum diameters of the cylinder 10. The housing 14 is grounded as at 26.

The housing 14 and a junction of the inductor 24 and the capacitor 21 are connected, respectively, to the outer 28 and to the inner 29 conductor of a concentric conductor 30. The inner conductor 29 extends to the anode of a diode 32. The inner conductor also extends by way of a capacitor 34 to an oscillator 36. The outer conductor 28 of the concentric conductor 30 may be formed to shield the diode 32 and the capacitor 34. The cathode of the diode 32 is connected to ground 26 by way of a load resistor 38 and a filter capacitor 39 in parallel. Therefore, as the cylinder rotates, a direct voltage which is positive with respect to ground appears across the resistor 38, this voltage being of constant amplitude if the cylinder 10 is perfectly cylindrical and this voltage varying in amplitude in such a manner that the maximum and minimum values of the voltage appearing across the resistor 38 are measures of the maximum and minimum diameters of the cylinder 10.

The ungrounded terminal of the resistor 38 is connected to the inverting (1) terminals of the differential amplifiers 40 and 42. The output of the differential amplifier 40 is connected to the base of a NPN transistor 44 whose emitter is connected to ground 26 and whose collector is connected to the cathode of a diode 46. The anode of the diode 46 is connected to the input of a very high input impedance, relatively low output impedance noninverting amplifier 48. The anode of the diode 46 is also connected through a storage capacitor 50 to ground 26, and to the collector of a PNP transistor 52. The emitter of the transistor 52 is connected to the positive terminal 54 of a source of potential (not shown) whose negative terminal is connected to ground. A Dump terminal 56 is connected to the input terminal of an invertor 57 whose output terminal is connected to the base of the transistor 52. The output terminal of the amplifier 48 is connected through a load resistor 58 to one terminal of a differential amplifier 60 and directly to the noninverting (NI) input terminal of the differential amplifier 40.

The output of the amplifier 42 is connected to the base of a PNP transistor 62. The emitter of the transistor 62 is connected to the positive terminal 54 of the source of potential (not shown). The collector of the transistor 62 is connected to the anode of a diode 64. The cathode of the diode 64 is connected to the input terminal of a very high input impedance, low output impedance noninverting amplifier 66. The cathode of the diode 64 is connected to ground 26 through a storage capacitor 68 and the cathode of the diode 64 is also connected to the collector of a NPN transistor 70. The emitter of the transistor 70 is connected to ground, and the base of the transistor 70 is connected to the Dump terminal 56. The output terminal of the amplifier 66 is connected through a load resistor 72 to the other input terminal of the differential amplifier 60. The output terminal of the amplifier 66 is connected to the NI terminal of the differential amplifier 42. The two input terminals of the amplifier 60 are connected by an adjustable tolerance resistor 74.

The output of the differential amplifier 60 is connected to one of the two input terminals of an AND circuit 76, and by way of an invertor 78 to one of the two input terminals of an AND circuit 80. The other input terminals of the AND circuits 76 and 80 are connected together and to a Read terminal 82. The output terminal of the AND circuit 76 is connected through an invertor 84 to a GO signal device 86 and the output terminal of the AND circuit 80 is connected through an invertor 88 to a NO GO signal device 90.

The operation of the described apparatus is as follows: The cylinder 10 is rotated, and as noted above, a varying direct voltage which is positive with respect to ground appears across the resistor 38. To prepare the apparatus to give an indication of out-of-roundness of the cylinder 10, that is, to prepare the apparatus to indicate the difference between the maximum and minimum dimensions thereof, a positive voltage with respect to ground is applied to the Dump terminal 56 whereby the transistors 52 and 70 are both made conductive. The capacitor 50 is charged to a voltage which is higher than any voltage appearing across the resistor 38 from the source which is connected to the terminal 54. The capacitor 68 is discharged to ground potential by way of the transistor 70. The positive potential on the terminals 56 ceases. As long as the potential at the NI terminal of the differential amplifier 40 is higher than the potential at the I terminal of this differential amplifier, a positive potential appears at the base of the transistor 44, permitting the capacitor 50 to discharge through the diode 46. However, a voltage is fed back from the noninverting amplifier 48 to the NI input terminal of the differential amplifier 40 that is a measure of the voltage across the capacitor 50. As the voltage on the capacitor 50 goes down, the voltage applied to the NI input terminal of the differential amplifier 40 also goes down. A point will be reached in the discharge of the capacitor 50 through the transistor 44 when the voltage at the NI input of the differential amplifier 40 is equal to the lowest excursion of the voltage applied to the I input thereof, and at this point, no potential or negative potential will be applied to the base of the transistor 44, and the transistor 44 will cease to conduct. At this time, the voltage at the output of the amplifier 48 is equal to the minimum voltage appearing across the resistor 38.

In a similar manner, as long as the voltage of the I input to the differential amplifier 42 is higher than the voltage at the NI input to this differential amplifier 42, negative potential will be applied to the base of the transistor 62 and the capacitor 68 will charge from the source connected to the terminals 54 through the transistor 62 and the diode 64 to a value such that the voltage at the output of the noninverting amplifier 66 is equal to the maximum voltage across the resistor 38. The application of the positive Dump signal to the terminal 56 not only causes charging of the capacitor 50 and discharging of the capacitor 68, but it also dissipates any stored voltages appearing on these capacitors due to previous tests or measurements. The amplifiers 48 and 66 have very high input impedances and therefore these amplifiers discharge their respective storage capacitors 50 and 68 very slowly. When the transistors 44, and 70 have zero or reverse potentials on their bases, their impedances are very high whereby they discharge their respective capacitors very slowly. Also when the transistors 52 and 62 have zero or positive potentials on their bases, their impedances are very high whereby they charge their respective capacitors very slowly. Therefore, the voltages at the output terminals of the amplifier 48 and 66 are measures of the minimum and maximum diameters respectively of the rotating part 10.

The degree of accuracy to which the high and the low voltage across the resistor 38 are stored in the respective capacitors 68 and 50 is limited only by the open loop gain of the respective differential amplifiers 42 and 40 and their input offset voltages. Therefore, with perfect differential amplifiers 42 and 40, the stored voltages on the capacitors 68 and 50 would be perfect measures of the high and the low voltages across the resistor 38.

The differential amplifier 60 has a built in threshold. That is, as long as the difference in voltages applied to the two input terminals of the differential amplifier 60 is less than a predetermined amount, the differential amplifier 60 provides a positive output voltage. Therefore, if the difference between the small and the large diameters of the cylinder 10 is such that the difference between the voltages applied to the input terminals of the amplifier 60 is less than the said threshold value thereof, the output of the differential amplifier 60 is positive.

This positive voltage is applied to one input terminal and the AND circuit 76 and is applied in an inverted phase to one input terminal of the AND circuit 80. When the difference in voltages applied to the two input terminals of the differential amplifier 60 is greater than the threshold value thereof, the output thereof is negative. This negative voltage is applied as negative potential to the said one input terminal of the AND circuit 76 and as positive potential to the said one input terminal of the AND circuit 80. Upon applying a positive test pulse to the Read terminals 82, that AND circuit 76 or 80 which has a positive voltage at both of its input terminals will have a low voltage at its output terminal and the appropriate signal device 86 or 90 will be operated, due to the action of the respective invertor 84 or 88, to indicate that the voltage between the input terminals of the differential amplifier 60 is less than or greater than the built in threshold value.

To permit adjustment of the tolerance of the described indicating apparatus even though a tolerance is built into the differential amplifier 60, the variable resistor 74 is provided. The value of the resistor 74 is adjusted so that the voltage across it is less than the built in tolerances for any degree of difference in maximum and minimum diameters of the cylinder 10 for which it is desired to produce a GO signal.

Modifications of the described dimension checking apparatus will occur to a person skilled in the art. Therefore the above description is to be taken as illustrative and not in a limiting sense.

What I claim is:

1. Apparatus for comparing two dimensions comprising,
   a single transducer having an output voltage whose amplitude varies with time, said amplitude having a maximum value representative of one of two dimensions and a minimum value representative of the other dimension,
   a peak value detector circuit for providing a first DC voltage corresponding to the maximum value of said amplitude,
   a minimum value detector circuit for providing a second DC voltage corresponding to the minimum value of said amplitude,
   threshold means having two input terminals and an output terminal which provides a first voltage output at its output terminal for all voltages applied to its input terminals whose difference is less than a threshold value, and which provides a second voltage output on said output terminal for all voltages applied to its input terminals whose difference is greater than said threshold value,
   means to apply said first and second DC voltages to the input terminals respectively of said threshold means, and
   indicator means coupled to the output terminal of said threshold device to provide an indication of the output voltage of said threshold device.

2. The invention as expressed in claim 1 in which a variable resistor is connected across the input terminals of said threshold means whereby the threshold of said threshold means in combination with said resistor may be varied.

3. Means for comparing two dimensions comprising
   means to store a voltage which is a measure of the smaller of the two dimensions,
   means to store a voltage which is a measure of the greater of the two dimensions,
   threshold means having two input terminals and an output terminal which provides a first voltage output at its output terminal for all voltages applied to its input terminals whose difference is less than said threshold value, and which provides a second voltage output on said output terminal for all voltages applied to its input terminals whose difference is greater than said threshold value,
   means to apply respective voltages which are measures of the voltages stored by said two storage means to the input terminals respectively of said threshold means,
   indicator means coupled to the output terminal of said threshold device to provide an indication of the output voltage of said threshold device,
   said first-mentioned voltage-storing means comprising a capacitor, means to charge said capacitor to a relatively high voltage, means to discharge said capacitor, a differential amplifier having a pair of input terminals and an output terminal, means to apply a voltage which is a measure of the smaller of said dimension to one input terminal of said differential amplifier, means to sense the voltage across said capacitor and means to apply a voltage to the other input terminal of said differential amplifier which is a measure of the voltage sensed by said voltage-sensing means, and means to connect the output terminal of said differential amplifier to said capacitor discharging means, whereby said capacitor is discharged until the voltage applied to one of the input terminals of said differential amplifier is equal to the minimum voltage applied to the other of said input terminals thereof.

4. Means for comparing two dimensions comprising
means to store a voltage which is a measure of the smaller of the two dimensions,
means to store a voltage which is a measure of the greater of the two dimensions,
threshold means having two input terminals and an output terminal which provides a first voltage output at its output terminal for all voltages applied to its input terminals whose difference is less than said threshold value, and which provides a second voltage output on said output terminal for all voltages applied to its input terminals whose difference is greater than said threshold value,
means to apply respective voltages which are measures of the voltages stored by said two storage means to the input terminals respectively of said threshold means, and
indicator means coupled to the output terminal of said threshold device to provide an indication of the output voltage of said threshold device,
said second voltage storage means comprising a capacitor, means to charge said capacitor, a differential amplifier having a pair of input terminals and an output terminal, means to apply a voltage which is a measure of said greater dimension to one input terminal of said differential amplifier, means to sense the voltage across said capacitor and means to apply a voltage to the other input terminal of said differential amplifier which is a measure of the voltage sensed by said voltage-sensing means, and means to connect the output terminal of said differential amplifier to said capacitor-charging means, whereby said capacitor is charged until the voltage applied to one of the input terminals of said differential amplifier is equal to the maximum voltage applied to the other of said input terminals.